US010006613B2

(12) United States Patent
Oudina et al.

(10) Patent No.: US 10,006,613 B2
(45) Date of Patent: Jun. 26, 2018

(54) BAR HANGER WITH SUBSTANTIALLY IDENTICAL MEMBERS FOR RECESSED LUMINAIRES

(71) Applicant: TRIPAR INC., Montreal (CA)

(72) Inventors: Abdelkrim Oudina, Montreal (CA); Lloyd Sevack, Dollard-des-Ormeaux (CA); John Payne, Repentigny (CA); Jenna Sevack, Dollard-des-Ormeaux (CA)

(73) Assignee: TRIPAR INC., Montreal (CA)

( * ) Notice: Subject to any disclaimer, the term of this patent is extended or adjusted under 35 U.S.C. 154(b) by 0 days. days.

(21) Appl. No.: 15/489,878

(22) Filed: Apr. 18, 2017

(65) Prior Publication Data

US 2017/0307188 A1 Oct. 26, 2017

Related U.S. Application Data

(60) Provisional application No. 62/324,958, filed on Apr. 20, 2016.

(51) Int. Cl.

| | |
|---|---|
| ***F16M 11/00*** | (2006.01) |
| ***F21V 21/04*** | (2006.01) |
| ***F21S 8/02*** | (2006.01) |
| ***E04B 9/00*** | (2006.01) |

(52) U.S. Cl.
CPC .............. *F21V 21/04* (2013.01); *E04B 9/006* (2013.01); *F21S 8/026* (2013.01)

(58) Field of Classification Search
CPC .... F16M 13/022; F21V 21/048; F21V 13/027
See application file for complete search history.

(56) References Cited

U.S. PATENT DOCUMENTS

| | | | |
|---|---|---|---|
| 4,165,851 | A | 8/1979 | Bowden, Jr. et al. |
| 5,029,794 | A | 7/1991 | Wolfe |
| 5,045,985 | A | 9/1991 | Russo et al. |
| 5,074,515 | A | 12/1991 | Carter, Jr. et al. |
| 5,386,959 | A | 2/1995 | Laughlin et al. |
| 5,690,423 | A | 11/1997 | Hentz et al. |
| 5,934,631 | A | 8/1999 | Becker et al. |
| 5,954,304 | A | 9/1999 | Jorgensen |
| 6,076,788 | A | 6/2000 | Akiyama |
| 6,105,918 | A | 8/2000 | Gromotka |
| 6,345,800 | B1 | 2/2002 | Herst et al. |
| 8,297,579 | B1 | 10/2012 | Gretz |
| 9,239,131 | B1 | 1/2016 | Wronski et al. |

(Continued)

*Primary Examiner* — Amy J. Sterling
(74) *Attorney, Agent, or Firm* — Banner & Witcoff, Ltd.

(57) ABSTRACT

A bar hanger member is provided. The bar hanger member is for assembling with another like-member by superposition thereon to form a bar hanger for supporting recessed luminaires. The bar hanger member includes: an elongated body having a front face and a rear face; a channel extending through the body along the lengthwise axis; and first and second protrusions extending from the body aligned with the channel. The first and second protrusions are sized and shaped for slidable engagement with the channel of the like-member. When the bar hanger is assembled with the like-member, the second protrusion of the bar hanger engages in the channel of the like-member and the first protrusion of the like-member engages in the channel of the bar hanger member.

20 Claims, 12 Drawing Sheets

(56) References Cited

U.S. PATENT DOCUMENTS

| | | | |
|---|---|---|---|
| 9,696,021 | B2 * | 7/2017 | Wronski ................. F21V 21/22 |
| 2003/0005517 | A1 | 1/2003 | Randolph |
| 2003/0006353 | A1 | 1/2003 | Dinh et al. |
| 2004/0182592 | A1 | 9/2004 | King et al. |
| 2005/0230589 | A1 | 10/2005 | Wronski |
| 2006/0033000 | A1 | 2/2006 | Seo |
| 2007/0075206 | A1 | 4/2007 | Wright et al. |
| 2008/0179481 | A1 | 7/2008 | Rubin De La Borbolla |
| 2008/0224008 | A1 | 9/2008 | Dal Ponte et al. |
| 2009/0231861 | A1 | 9/2009 | Wedekind |
| 2011/0226919 | A1 | 9/2011 | Fryzek et al. |
| 2014/0299730 | A1 | 10/2014 | Green et al. |
| 2014/0353442 | A1 | 12/2014 | Ye |

* cited by examiner

BAR HANGER WITH SUBSTANTIALLY IDENTICAL MEMBERS FOR RECESSED LUMINAIRES

RELATED PATENT APPLICATION

The present application claims priority from U.S. provisional patent application No. 62/324,958, filed on Apr. 20, 2016, the contents of which are incorporated herein by reference.

TECHNICAL FIELD

The technical field generally relates to bar hangers. More specifically, it relates to length-adjustable bar hangers for supporting recessed luminaires.

BACKGROUND

Recessed lighting fixtures are commonly held up in ceilings prior to installation of the ceiling panel by way of two bars, commonly known as bar hangers. These are sometimes adjustable in length, and have means to attach or locate on ceiling joists and/or suspended ceiling grid systems such as T-bars.

In one design, the bar hanger consists of a male member which slides within a female member, allowing the overall length to vary depending on ceiling requirements. Locking the members together is often achieved by way of a locking screw, and the desired distance of the overall bar hanger is typically only achieved once the recessed light fixture assembly is raised up to the ceiling.

Current bar hanger systems have several limitations. Generally, two different members are required (e.g., one male and one female), thus requiring one of each of member to assemble a bar hanger. Moreover, the tightening of a fastener is often required to lock an extension, requiring a specific tool, e.g. screwdriver, wrench, or bit, which can also only be accessed from a specific orientation of the tool. Further, existing locking systems can leave unwanted play and reduced rigidity, and greater deflection under load. Additionally, there is no way to extend the bar hangers to pre-set distances without using a tape measure or other external measuring device. Finally, existing bar hangers have limited spans, either finite, or only extendable beyond a primary limit with a separate extension element.

SUMMARY

It is therefore an object of the present disclosure to overcome at least some of the shortcoming of the prior art.

According to an aspect, a bar hanger member is provided. The bar hanger member is for assembling with another identical bar hanger member to form a bar hanger for supporting recessed luminaires. The bar hanger member has a unitary body including: an elongated section extending along a lengthwise axis between first and second ends, the elongated section having an L-shaped profile with a front face and a rear face; a channel extending through the elongated section along the lengthwise axis, and opening on the front and rear faces, the channel including first and second slots proximate to the first end for receiving correspondingly shaped protrusions therethrough; first and second protrusions extending from the elongated section proximate to the first end and aligned with the channel along the lengthwise axis, the first and second protrusions being shaped to fit through the first and second slots and slide along the channel, the first protrusion extending from the front face of the elongated section, and the second protrusion extending from the rear face of the elongated section; and a mounting plate extending from the second end for securing the bar hanger member to a joist. The bar hanger is assembled with the identical bar hanger member to form a bar hanger having a C-shaped profile by superposing the bar hanger member on the identical bar hanger member in an inverted configuration, with the second protrusion of the bar hanger engaging in the channel of the identical member through the first slot of the identical member, and the first protrusion of the identical member engaging in the channel of the bar hanger member through the second slot of the bar hanger member.

According to an aspect, a bar hanger member is provided. The bar hanger member is for assembling with another like-member by superposition thereon to form a bar hanger for supporting recessed luminaires. The bar hanger member includes: an elongated body extending along a lengthwise axis between first and second ends, the elongated body having a front face and a rear face; a channel extending through the body along the lengthwise axis, and opening on the front and rear faces; and first and second protrusions extending from the body aligned with the channel along the lengthwise axis, the first and second protrusions being sized and shaped for slidable engagement with the channel of the like-member, the first protrusion extending from the front face of the body and the second protrusion extending from the rear face of the body, and when the bar hanger is assembled with the like-member, the second protrusion of the bar hanger engaging in the channel of the like-member and the first protrusion of the like-member engaging in the channel of the bar hanger member.

According to an aspect, a bar hanger member is provided. The bar hanger is for assembling with another like-member to form a bar hanger for supporting recessed luminaires. The bar hanger member includes: an elongated body extending along a lengthwise axis between first and second ends, the elongated body having a front face and a rear face; a channel extending through the body along the lengthwise axis and opening on the front and rear faces, the channel having a consistent width; and at least one protrusion extending from the body and aligned with the channel along the lengthwise axis, the at least one protrusion including a substantially planar stem having a width greater than the width of the channel, the stem being angled relative to the channel for sliding along the channel of the like-member when engaged therewith. The bar hanger member is assembled with the like-member by engagement of the at least one protrusion in the channel of the like-member, the stem of the at least one protrusion being twistable to lock the at least one protrusion in a fixed position along the channel of the like-member.

According to an aspect, a bar hanger member is provided. The bar hanger member is for assembling with another like-member to form a bar hanger for supporting recessed luminaires. The bar hanger member includes: an elongated body extending along a lengthwise axis, the elongated body having a substantially L-shaped profile; and an attachment mechanism on the elongated body for engaging the bar hanger member with the like-member when the like-member is inverted and the bar hanger member is superposed thereon. When assembled, the bar hanger member and the like-member together form the bar hanger having a substantially C-shaped profile.

According to an aspect, a bar hanger member is provided. The bar hanger member is for assembling with another identical bar hanger member to form a bar hanger for supporting recessed luminaires. The bar hanger member has a unitary body including: an elongated section extending along a lengthwise axis, the elongated section having a substantially L-shaped profile; an attachment mechanism on the elongated section for engaging the bar hanger member with the identical bar hanger member when the bar hanger member and the identical member are inverted relative to one another; and an attachment bracket extending from an end of the elongated section for securing the bar hanger member to a joist.

According to an aspect, a bar hanger member is provided. The bar hanger member is for assembling with another like-member to form a bar hanger for supporting recessed luminaires. The bar hanger member has a unitary body including: an elongated section extending along a lengthwise axis; an attachment mechanism on the elongated section for engaging the bar hanger member with the identical bar hanger member when the bar hanger member and the identical member are inverted relative to one another; and an attachment bracket extending from an end of the elongated section for securing the bar hanger member to a joist, the attachment bracket including a mounting plate, two positioning tabs extending from opposite ends of the mounting plate, and slots extending between the mounting plate and each positioning tab to allow the positioning tabs to be deflected relative to the mounting plate.

According to an aspect, a bar hanger member is provided. The bar hanger member is for assembling with another like-member to form a bar hanger for supporting recessed luminaires. The bar hanger member has a unitary body including: an elongated section extending along a lengthwise axis; an attachment mechanism on the elongated section for engaging the bar hanger member with the like-member when the bar hanger member and like-member are inverted relative to one another; and an attachment bracket extending from an end of the elongated section for securing the bar hanger member to a joist, the attachment bracket including a mounting plate, and two positioning tabs extending from opposite ends of the mounting plate, the positioning tabs each comprising a slot open at one end for sliding along and being removed from a supporting nail.

According to an aspect, a bar hanger member is provided. The bar hanger member is for assembling with another like-member to form a bar hanger for supporting recessed luminaires. The bar hanger member has a unitary body including: an elongated section extending along a lengthwise axis; an attachment mechanism on the elongated section for engaging the bar hanger member with the like-member when the bar hanger member and the like-member are inverted relative to one another; an attachment bracket extending from an end of the elongated section for securing the bar hanger member to a joist; and an angled notch at the end of the elongated section adjacent the attachment bracket for resting on a T-bar, the angled notch urging the bar hanger towards a top of the T-bar when the bar hanger is secured thereto.

DETAILED DESCRIPTION

In the following description, the same numerical references refer to similar elements. Furthermore, for the sake of simplicity and clarity, namely so as to not unduly burden the figures with several references numbers, not all figures contain references to all the components and features of the present invention and references to some components and features may be found in only one figure, and components and features of the present invention illustrated in other figures can be easily inferred therefrom. The embodiments, geometrical configurations, materials mentioned and/or dimensions shown in the figures are preferred, for exemplification purposes only.

It is to be understood that certain descriptions of embodiments have been simplified to illustrate only those elements and limitations that are relevant to a clear understanding, while eliminating, for purposes of clarity, other elements. Those of ordinary skill in the art, upon considering the present description, will recognize that other elements and/or limitations may be desirable. However, because such other elements and/or limitations may be readily ascertained by one of ordinary skill upon considering the present description, and are not necessary for a complete understanding, a discussion of such elements and limitations is not provided herein. As such, it is to be understood that the description set forth herein is merely exemplary and is not intended to limit the scope of protection.

Figures 1, 1A:
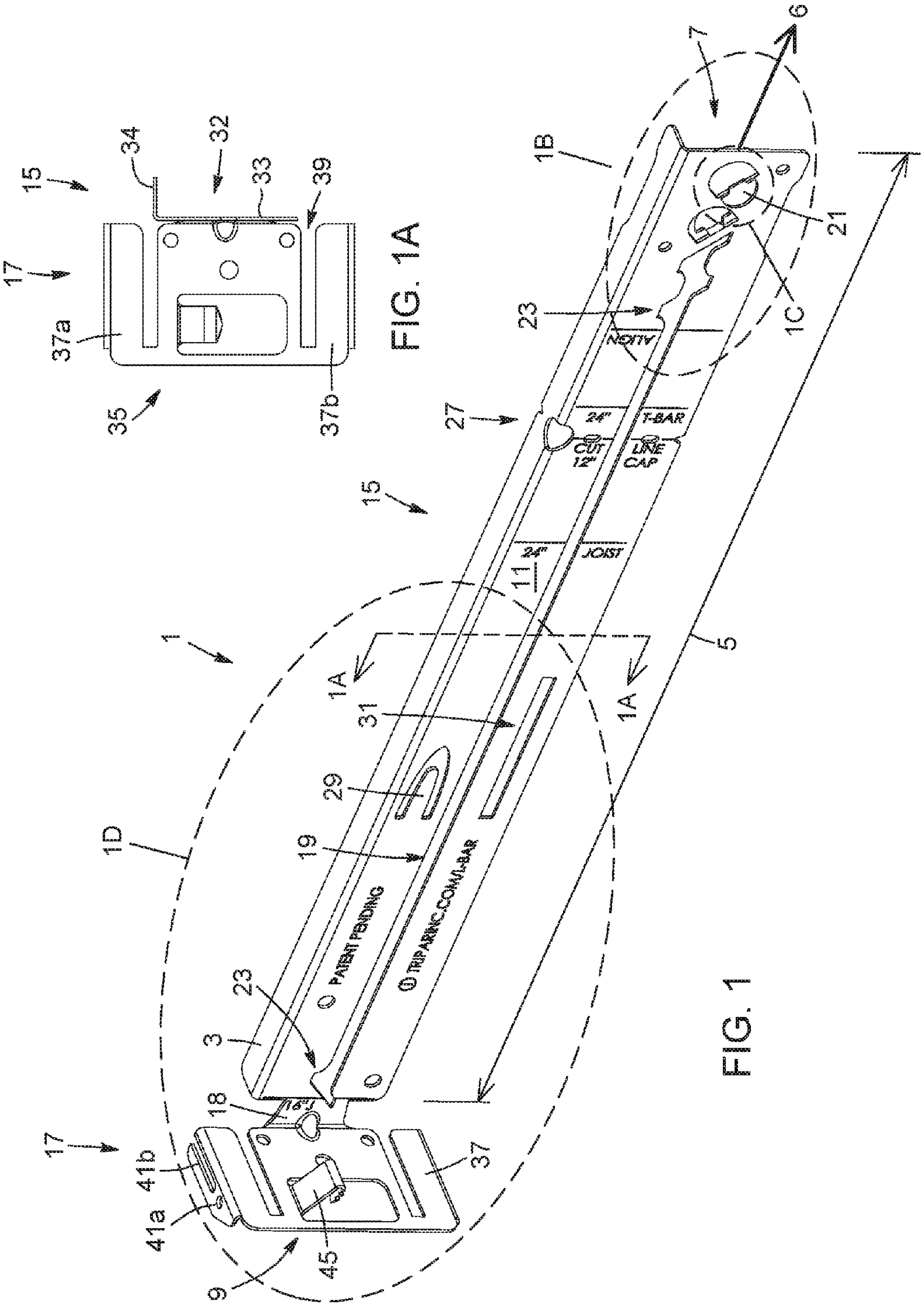
FIG. 1 is a front perspective view of a bar hanger member, according to an embodiment.
FIG. 1A is a cross-section view showing the L-shaped profile of the bar hanger member.
Figure 2:
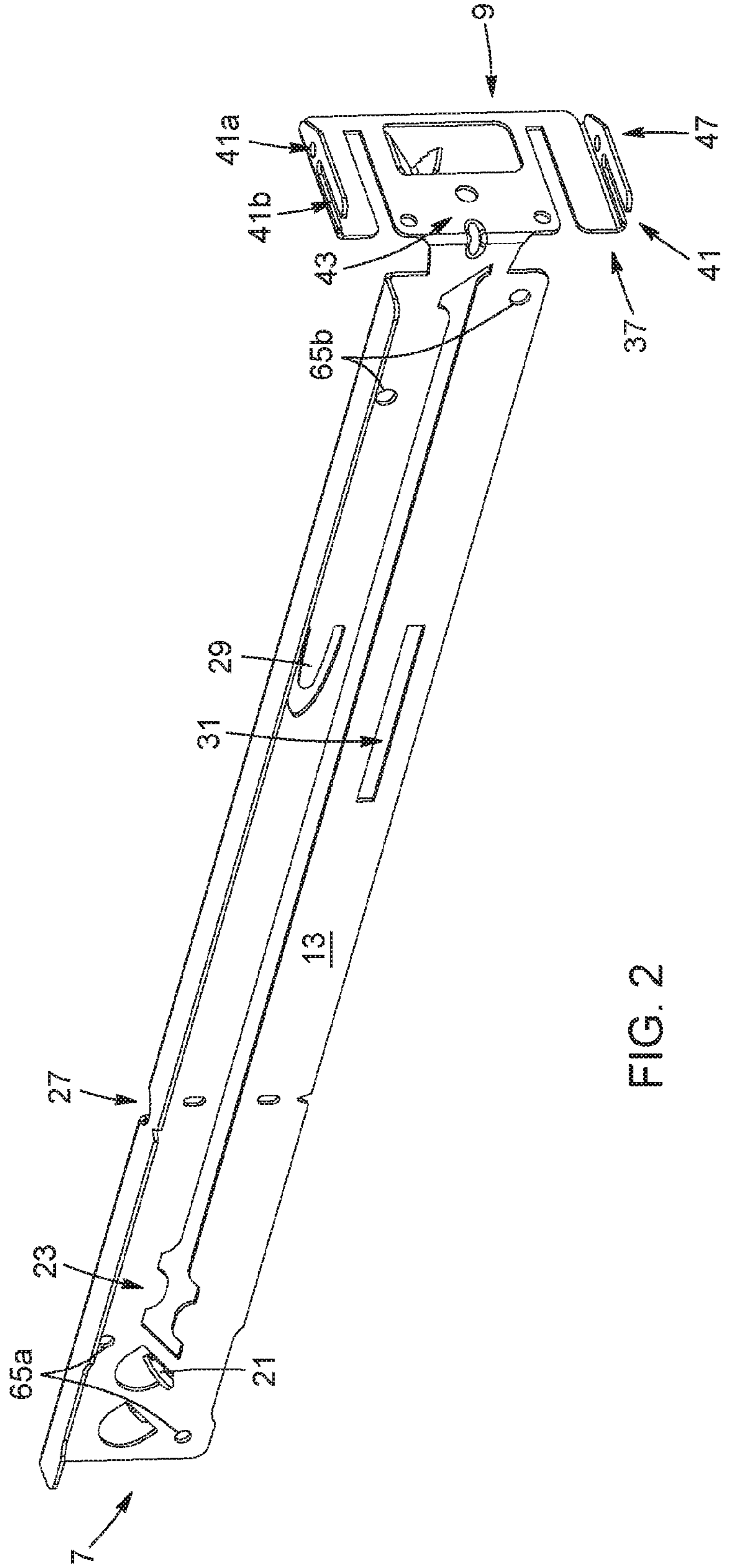
FIG. 2 is a rear perspective view of the bar hanger member of FIG. 1.

With reference to FIGS. 1 and 2, a bar hanger member 1 is shown according to an embodiment. The bar hanger member 1 comprises a body 3 having an elongated section 15 and a head section 17. In the present embodiment, the body 3 is a unitary body in that the elongated section 15 and the head section 17 are formed from the same piece of material, for example from a single piece of stamped sheet metal. It is appreciated, however, that in other embodiments, the body 3 can comprise an elongated section 15 and a head section 17 which are separate pieces that can be joined together. It is further appreciated that in other embodiments, the body 3 can be formed from materials other than stamped metal.

The elongated section 15 has a length 5, extending along a lengthwise axis 6 between a first end 7 and a second end 9. In the present embodiment, the elongated section 15 is substantially flat and planar, and comprises a front face 11 and a rear face 13, and an aperture opening on the front and rear faces 11, 13. The aperture comprise a channel 19 extending centrally in the elongated section 15 along the lengthwise axis 6, substantially along the entire length 5 of the elongated section. In the present embodiment, the channel 19 is a narrow cut-out in the body 3 having a nominal width 49. Preferably, the channel is continuous, uniform and smooth along its length, allowing a member engaged therein to slide there along uninterrupted. It is appreciated that in other embodiments, other configurations of the channel 19 are also possible. For example the channel 19 can be a groove formed in the body 3, and can open on only one of the front 11 and rear 13 faces. In other embodiments, two or more channels can be provided, and the channels may be offset from the center of the elongated section 15. The channels can further span a partial length of the elongated section, can be non-uniform, and/or can be provided with textured contours (such as bumps or teeth), for example to provide friction or resistance to sliding along segments of the channels.

With further reference to FIG. 1A, in the present embodiment, the elongated section 15 has a substantially L-shaped profile 32. More specifically, the elongated section 15 comprises a vertical section 33 and a horizontal section 34 positioned to form an L-shape 32. The vertical section 33 comprises the front 11 and rear 13 faces, while the horizontal section 34 extends from a top edge of the vertical section 33 at substantially right angle. In the present embodiment, the horizontal section 34 extends entirely on the rear side of the bar hanger member 1, i.e. in the facing direction of the rear face 13, and is formed by bending a top portion of the vertical section 33 rearwards. As can be appreciated, the horizontal section 34 can serve to provide rigidity and stiffness to the body 3, and can thus also be referred to as a reinforcing member. Preferably, the horizontal section 34 extends from an edge of the vertical section 33, substantially along the full length 5 thereof. However, other configurations of the horizontal section 34 are also possible. For example, the horizontal section 34 can extend along partial segments of the length 5, along both edges of the vertical section 33, and/or on the front side of the bar hanger member 1. It is also appreciated that other profile shapes of the elongated section are also possible. For example, the elongated section 15 can be S-shaped or Z-shaped. However, it is preferred that the elongated section 15 be shaped so that it can engage with another like-member by superposition thereon, as will be described in more detail hereinafter. In some embodiments, a reinforcing member need not be provided, and the elongated section 15 can comprise only the vertical section 33.

The head section 17 extends from the elongated section 15 at the second end 9 thereof. In the present embodiment, the head section 17 extends entirely on the front side of the bar hanger member 1, i.e. in the facing direction of the front face 13, and preferably on a side of the bar hanger member 1 opposite the horizontal section 34 of the elongated section 15. Preferably, the head section 17 is formed by bending a portion of the body 3 frontwards. It is appreciated, however, that other configurations of the head section 17 are also possible. For example, the head section 17 can extend fully or partially on the rear side of the bar hanger member 1, and/or can extend from the first end 7 of the elongated section 15.

Figure 1B:
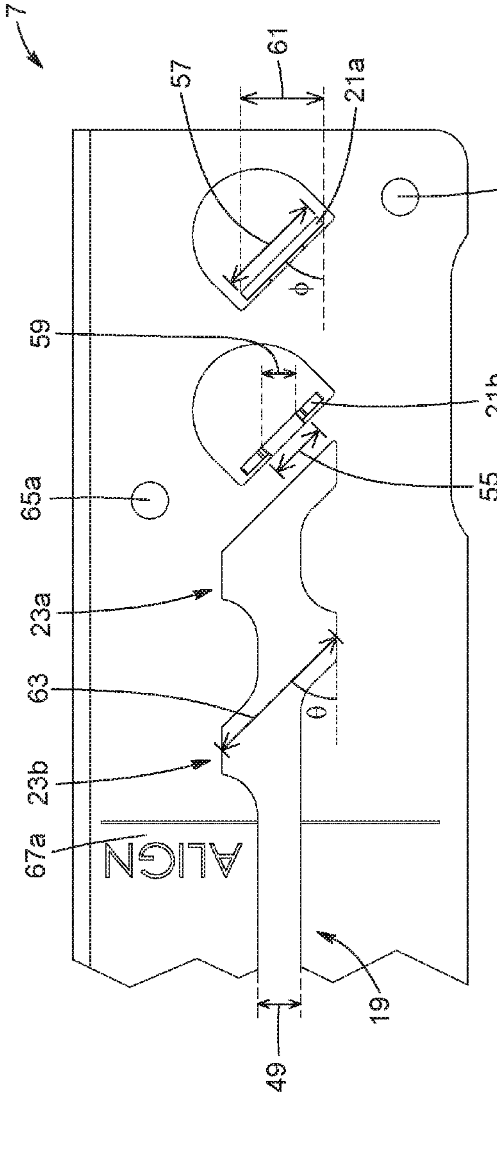
FIG. 1B is a detail view showing the first end of the bar hanger member.

In the present embodiment, the elongated section 15 and the head section 17 are joined via a bridge 18. The bridge 18 is a narrow section of the body 3 which connects at one end to the elongated section 15 and at the other end to the head section 17. With further reference to FIG. 1D, the bridge 18 extends in the same plane as the elongated section 15, and comprises an upper edge 24*a* and a lower edge 24*b*. Preferably, the edges 24*a*, 24*b* are tapered inward from the head section 17 to the elongated section 15, defining a tapered slots 25*a*, 25*b* for resting the second end 9 of the bar hanger member 1 on a T-bar. As will be explained in more detail hereinafter, the tapered slots 25 can allow for biasing the bar hanger member 1 towards a T-bar when secured thereto, for creating a snug fit therewith. It is appreciated that other configurations of the bridge 18 are also possible. For example, either one or neither of the edges 24*a*, 24*b* can be tapered, or the elongated section 15 can connect directly to the head section 17 without a bridge. Moreover, in the present embodiment, the bridge 18 is integrally formed as part of the unitary body 3 forming the bar hanger member 1. However it is appreciated that in other embodiments, the bridge 18 can be a separate piece, and/or can be part of pieces separately forming the elongated section 15 or the head section 17.

The head section 17 is preferably configured to secure the bar hanger member 1 to a support member in a ceiling, and can therefore also be referred to as an attachment bracket. In the present embodiment, the head section 17 comprises a mounting plate 35 extending at a substantially right angle relative to the elongated section 15. The mounting plate 35 is substantially planar, such that it can be positioned flat up against a side of a support member, such as a ceiling joist. The mounting plate 35 comprises apertures 43 for receiving fastening means, such as screws or nails. In the present embodiment, the mounting plate 35 further comprises an integrated nail 45. Preferably, the integrated nail 45 is provided in a retracted position, and can be hammered into a wooden joist for securing the bar hanger member 1 thereto without the need for external fasteners, or in combination with other fasteners to provide additional retention. It is appreciated that other configurations of the mounting plate 35 are also possible. For example, the mounting plate 35 can be provided with a different number, arrangement and size of apertures, and can be configured to secure the bar hanger member 1 with different fastening means.

The head section 17 is further provided with positioning tabs 37 for aligning the head section 17 with a ceiling joist. In the present embodiment, the positioning tabs 37 comprise an abutment member 47 extending away from the mounting plate 35. The positioning tabs 37 are configured such that when the head section 17 is positioned on a ceiling joist, the abutment member 47 abuts against an upper or lower edge of the ceiling joist, thus maintaining the head section 17 in vertical alignment with that edge. The abutment member 47 further comprises apertures 41 for securing the alignment tabs 37 to the ceiling joist via fasteners. In the present embodiment, two apertures 41*a* and 41*b* are provided. Aperture 41*b* is a slot which opens on one edge of the abutment member. As can be appreciated, in this configuration, the positioning tab 37 can slide along a fastener partially inserted through the slot 41*b*. The positioning tab 37 can further be disengaged from the fastener by sliding it past the open end of the slot 41*b*. It is appreciated that in other embodiments, a different combination of apertures 41 and configurations are possible, and that the positioning tabs 37 can be configured to be secured to ceiling joist via different attachment means.

In the present embodiment, the positioning tabs 37 are spaced apart from the mounting plate 35 via a deflecting slot 39. The deflecting slot 39 is a cut-out extending width-wise in the head section 17 and having an open end and a closed end. The open end opens on an edge of the head section 17, while the closed end defines a narrow strip of material connecting the mounting plate 35 and the positioning tabs 37. In the present embodiment, the entire body 3, including the narrow strip of material, is formed from sheet metal. As such, the positioning tabs 37 can be deflected relative to the mounting plate 35 by bending along the narrow strip of material defined by the deflecting slot 39. It is appreciated that in other embodiments, the positioning tabs 37 can be deflected relative to the mounting plate 35 using different structural configurations, such as by allowing complete removal of the positioning tabs 37, for example using score lines and/or by using a more brittle material to connect the mounting plate 35 and positioning tabs 37.

As can be appreciated, in the present embodiment, the head section 17 is configured such that it can engage with a support member both when upright and when in an inverted configuration. More specifically, the head section 17 is configured to be substantially symmetric about the lengthwise axis 6, including symmetric top and bottom positioning tabs 37*a* and 37*b*, and apertures 43 arranged in a symmetric configuration. The integrated nail 45 is configured to be hammered in through the center of a substantially symmetric opening in the mounting plate 35, thus allowing it to be secured to a joist in any orientation.

Figure 3A:
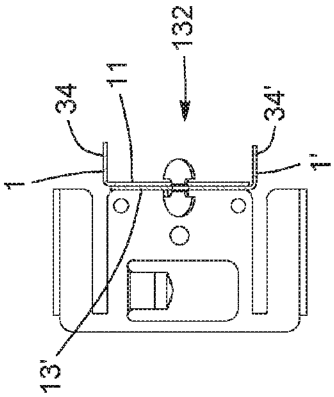
FIG. 3A is a cross-section view showing the C-shaped profile of the bar hanger.
Figure 3:
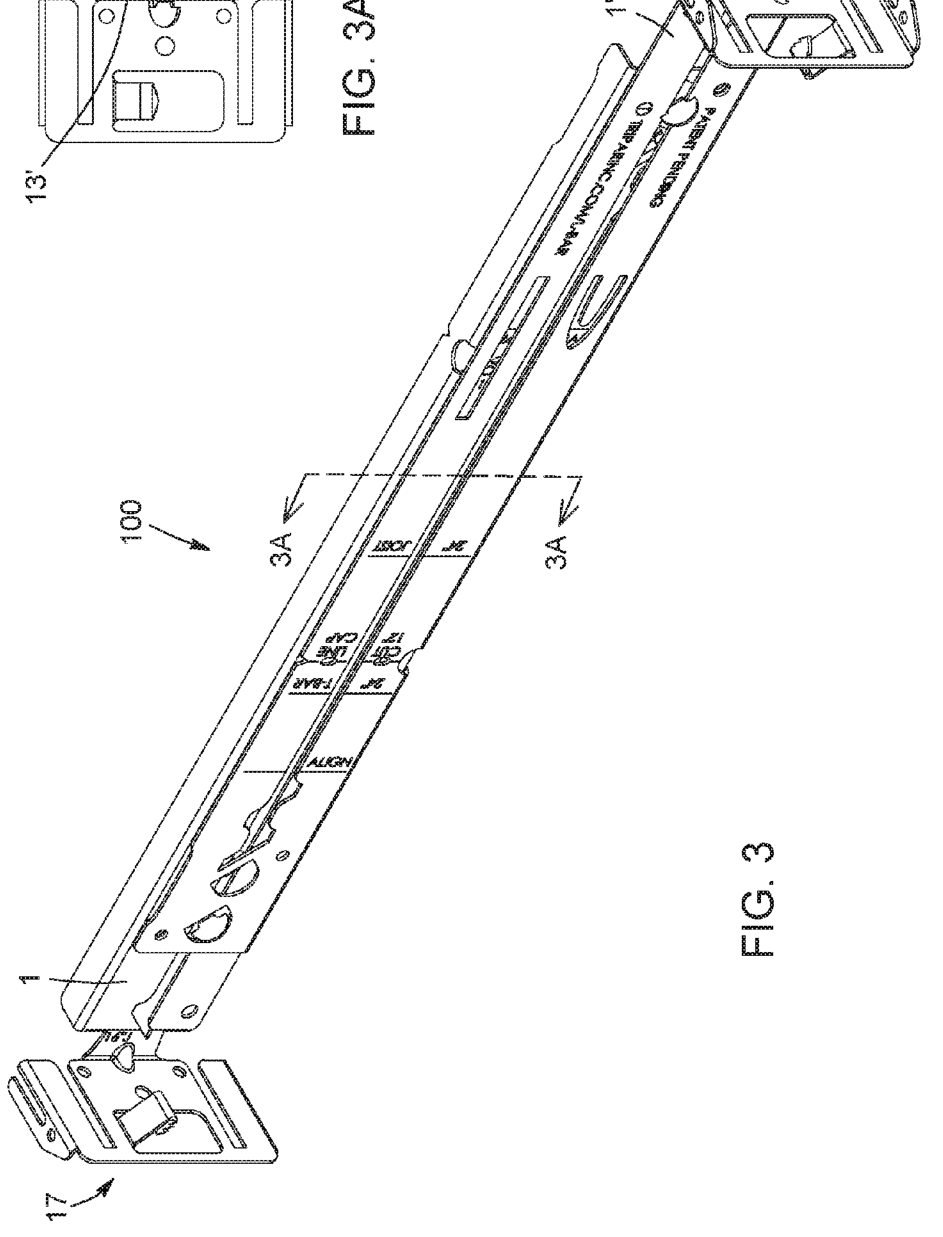
FIG. 3 is a front perspective view showing a bar hanger assembled using two identical bar hanger members, the bar hanger members corresponding to the embodiment illustrated in FIG. 1.

The illustrated bar hanger member 1 is configured to engage with another like-member, and preferably with an identical bar hanger member, in order to form a bar hanger for supporting a recessed luminaire. With reference to FIGS. 3 and 3A, the bar hanger member 1 can be assembled with an identical bar hanger member 1' in an inverted configuration, preferably by superposition in a substantially co-planar manner. The identical bar hanger member 1' is said to be in an inverted configuration in that it has been rotated 180° about an axis normal to the front or rear face 11, 13. In this configuration, the rear face 13' of member 1' is superposed on the front face 11 of member 1, with the horizontal sections 34, 34' and the head sections 17, 17' of both members 1, 1' extending in the same direction. When assembled, members 1, 1' form a bar hanger 100 having a substantially C-shaped profile 132.

To facilitate assembly, the bar hanger member 1 is provided with engagement mechanisms allowing it to engage with, and secured to, the identical bar hanger member 1'. The engagement mechanisms can also be referred to as interlocking mechanisms. A first engagement mechanism allows two bar hanger members 1, 1' to be assembled with an adjustable or telescopic length. With reference to FIGS. 1, 1B and 2, the first engagement mechanism comprises protrusions 21 and corresponding channel slots 23 proximate to the first end 7 of the elongated section 15 of the body 3. The channel slots 23 are widened sections of the channel 19 for receiving a protrusion 21 there through, and for initiating an engagement of the protrusion 21 in the channel 19. The protrusions 21 extend from the front 11 and/or rear 13 faces of the elongated section 15 and are configured to engage in, and slide along, the channel 19 of an identical bar hanger member via the slots 23.

In the present embodiment, two protrusions 21*a*, 21*b* are formed in the body 3 of the bar hanger member 1. The first protrusion 21*a* extends from the front face 11 of the elongated section 15, whereas the second protrusion 21*b* extends from the rear face 13 of the elongated section. The first 21*a* and the second 21*b* protrusions are spaced apart from one another and are positioned proximate the first end 7 of the elongated section 15. They are further positioned in alignment with the channel 19 along the lengthwise axis 6. Similarly, first and second channel slots 23*a*, 23*b* are formed along the channel 19. Both slots 23*a*, 23*b* are positioned proximate the first end 7 of the elongated section 15, and are spaced apart from one another, preferably by the same distance separating the protrusions 21*a*, 21*b*.

Figure 1C:
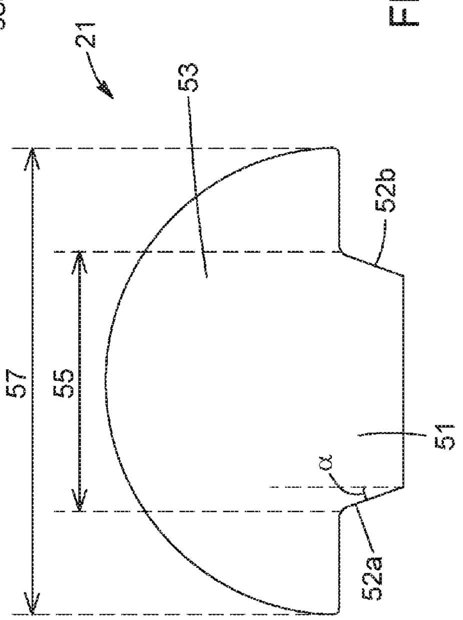
FIG. 1C is a detail view showing a protrusion in the bar hanger member.
Figure 1D:
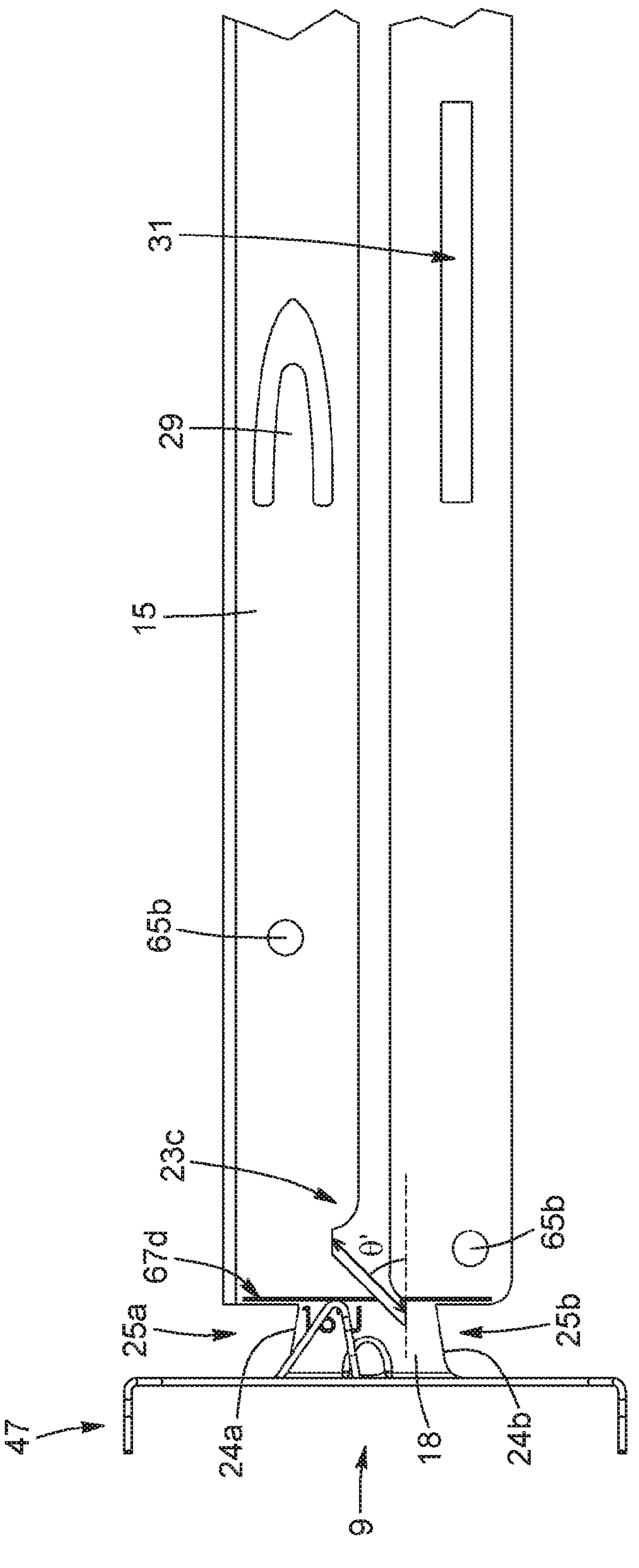
FIG. 1D is a detail view showing the second end of the bar hanger member.

As best illustrated in FIGS. 1B and 1C, each protrusion 21 is substantially planar and comprises a stem 51 and a head 53. The stem 51 is a narrow section at the base of the protrusion 21 having a width 55, while the head 53 extends from the stem 51 and has a width 57 which is greater than the width 55 of the stem 51. In the present embodiment, the head 53 is rounded and is substantially mushroom-shaped. It is appreciated, however, that other shapes of the head are also possible. In the present embodiment, the stem 51 is tapered, and thus has a width 55 increasing towards the head 53. Preferably, the width 55 of the stem 51 increases linearly as it approaches the head 53. In other words, the stem 51 comprises first and second edges 52*a*, 52*b*, and at least one of the first and second edges 52*a*, 52*b* are positioned at an oblique angle α relative to the vertical. It is appreciated that in other embodiments, other configurations of the protrusions 21 are also possible. For example, the stem 51 may not be tapered, and/or a head 53 need not be provided.

Preferably, the stem 51 and head 53 are dimensioned to allow the protrusions 21 to engage in, and to slide along, the channel 19 of an identical bar hanger member. In the present embodiment, the protrusions 21 are oriented relative to the channel 19 at an angle φ, such as between approximately 30° and 60°, and preferably approximately 45°. In this configuration, the width 55 of the stem 51 has a vertical component 59 which is smaller than the width 55. Similarly, the width 57 of the head 53 has a vertical component 61 which is smaller than the width 57. The stem 51 is dimensioned such that the vertical component 59 is smaller than or equal to the nominal width 49 of the channel 19 of the identical bar hanger member, allowing the stem 51 to fit there-through and to slide there-along. Similarly, the head 53 is dimensioned such that the vertical component 61 is larger than the nominal width 49 of the channel 19 of the identical bar hanger member, such that the head 53 cannot fit through the channel 19.

In the present embodiment, the channel slots 23 are also oriented relative to the channel 19 at an angle θ, which preferably corresponds to the angle φ of the protrusions, i.e. approximately 45°. The channel slots 23 have a width 63 which is preferably greater than the width 57 of the protrusion head 53. In this configuration, the protrusions 21 and channel slots 23 are complementary in shape and size, such that when the protrusion 21 is aligned with the slot 23, the head 53 can fit therethrough and initiate an engagement in the channel 19.

Preferably, the width 55 of stem 51 is greater than the nominal width 49 of channel 19. In this configuration, while oriented at angle φ, the protrusion 21 can slide freely along channel 19. However, the protrusion 21 is preferably made of a malleable material, such as sheet metal, which can preferably be twisted or rotated such that the protrusion 21 is oriented substantially vertically. In this configuration, when twisted, the vertical component 59 of the stem 51 increases up to the width 55 while the stem is inside the channel 19 of the identical bar hanger member. Since the width 55 is greater than the width 59, the stem 51 will lock in the channel 19, and will no longer be able to slide there along. As such, the protrusions 21 can also be referred to as locking tabs. As can be appreciated, the protrusions 21 need not be twisted so that they are fully vertical, and can, for example, be twisted only ⅛ of a turn to engage. Further, in configurations where the stem 51 is tapered, the channel 19 of the identical bar hanger member will be drawn towards the base of the stem 51 (i.e. where the stem is narrowest) when the stem 51 is twisted, thus drawing the bar hanger member 1 closer to the identical bar hanger member when the locking tab 21 is operated.

Figure 4A:
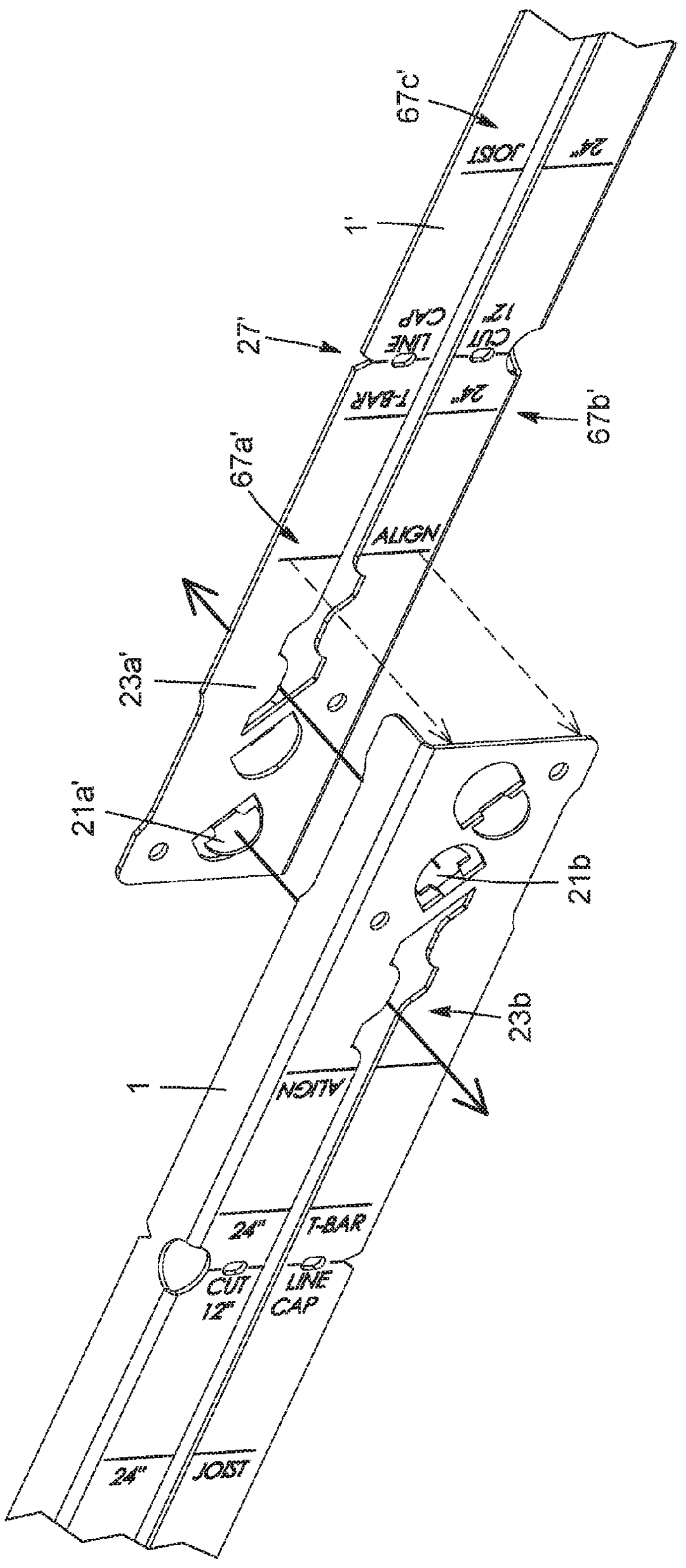
FIGS. 4A and 4B are detail views showing the assembly of two identical hanger members of FIG. 1 to form the bar hanger of FIG. 3.
Figure 4B:
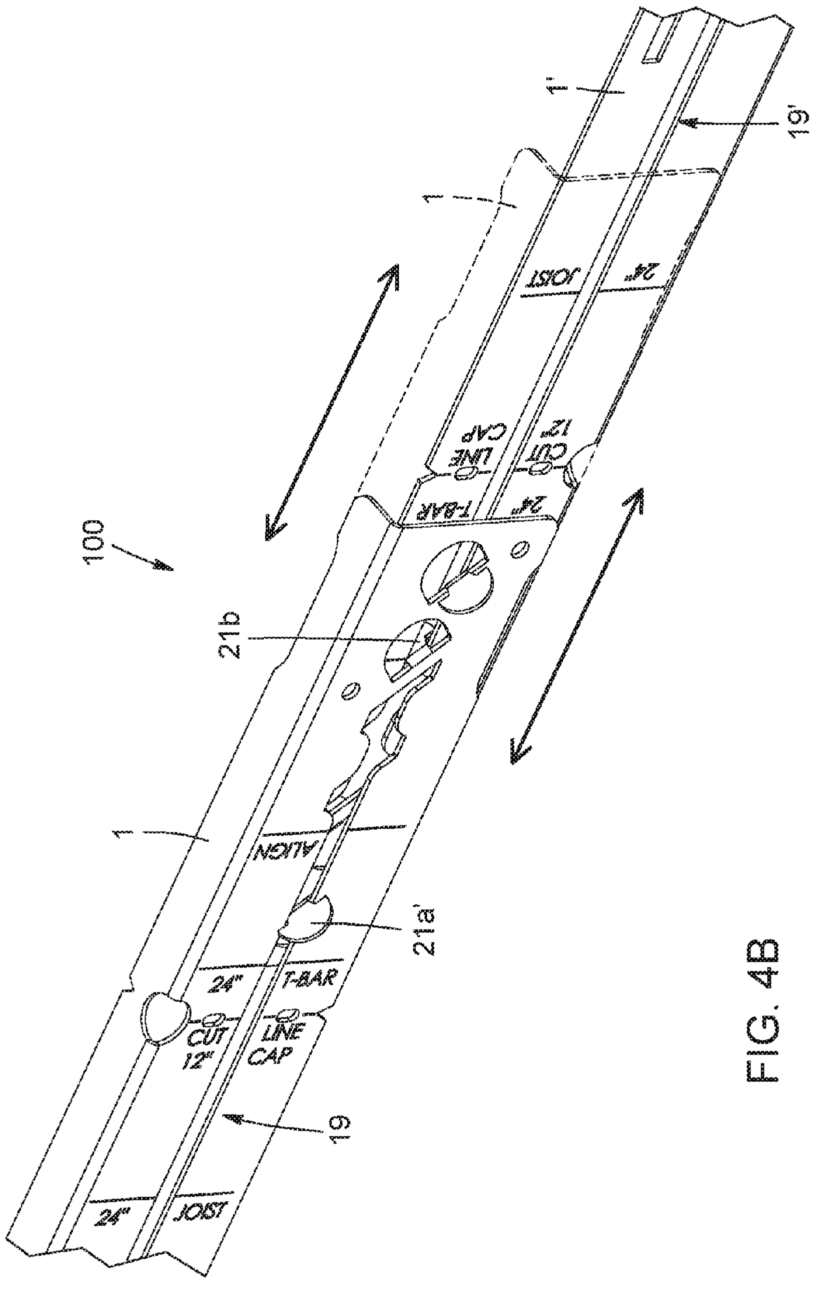

As best illustrated in FIGS. 4A and 4B, the bar hanger members 1, 1' can be assembled by inverting bar hanger member 1', and positioning bar hanger members 1, 1' end-to-end with the first protrusion 21*a*' of member 1' aligned with second slot 23*b* of member 1, and with second protrusion 21*b* of member 1 aligned with first slot 23*a*' of member 1'. Once aligned, members 1, 1' can be brought together, such that protrusion 21*a*' is inserted through slot 23*b*, and protrusion 21*b* is inserted through slot 23*a*'. Once engaged, the members 1, 1' can slide relative to one another along their lengthwise axes 6, allowing the overall length of the bar hanger 100 to be adjusted. The length of the bar hanger 100 can be locked by twisting protrusion 21*a*' and/or 21*b*, for example using pliers. As can be appreciated, protrusion 21*a*' is accessible from a front side of the bar hanger 100, while protrusion 21*b* is accessible from a rear side, making the engagement mechanism accessible and operable from all sides of the bar hanger 100, including the side, bottom, top, and any position therebetween, using a tool such as pliers. As can be further appreciated, the members 1, 1' can be engaged and secured without external fasteners. The engagement mechanism described above can thus be referred to as a fastenerless locking mechanism. and accessible from multiple orientations.

Preferably, the members 1, 1' are sized so that when engaged as described above, the bar hanger 100 can be adjusted to span a distance between at least 16" and 24". In the present embodiment, the members 1, 1' are configured to be adjusted between at least three predefined positions to span 24" spaced T-bars, 24" spaced joists, and 16" spaced joists. However, it is appreciated that the member 1, 1' can be adjusted to fit any distance therebetween. Alignment of members 1, 1' at the predefined positions can be facilitated via markings 67 provided on the front and/or rear faces 11, 13 of the members 1, 1'. For example, an alignment market 67*a* can facilitate the alignment of the ends of both members 1, 1' to initiate engagement, and length markers 67*b*, 67*c*, 67*d* can aid in aligning the members 1, 1' to achieve a desired spanning distance. As can be appreciated, the markings can be used to align and lock members 1, 1' to the proper size before ceiling installation.

Figure 5:
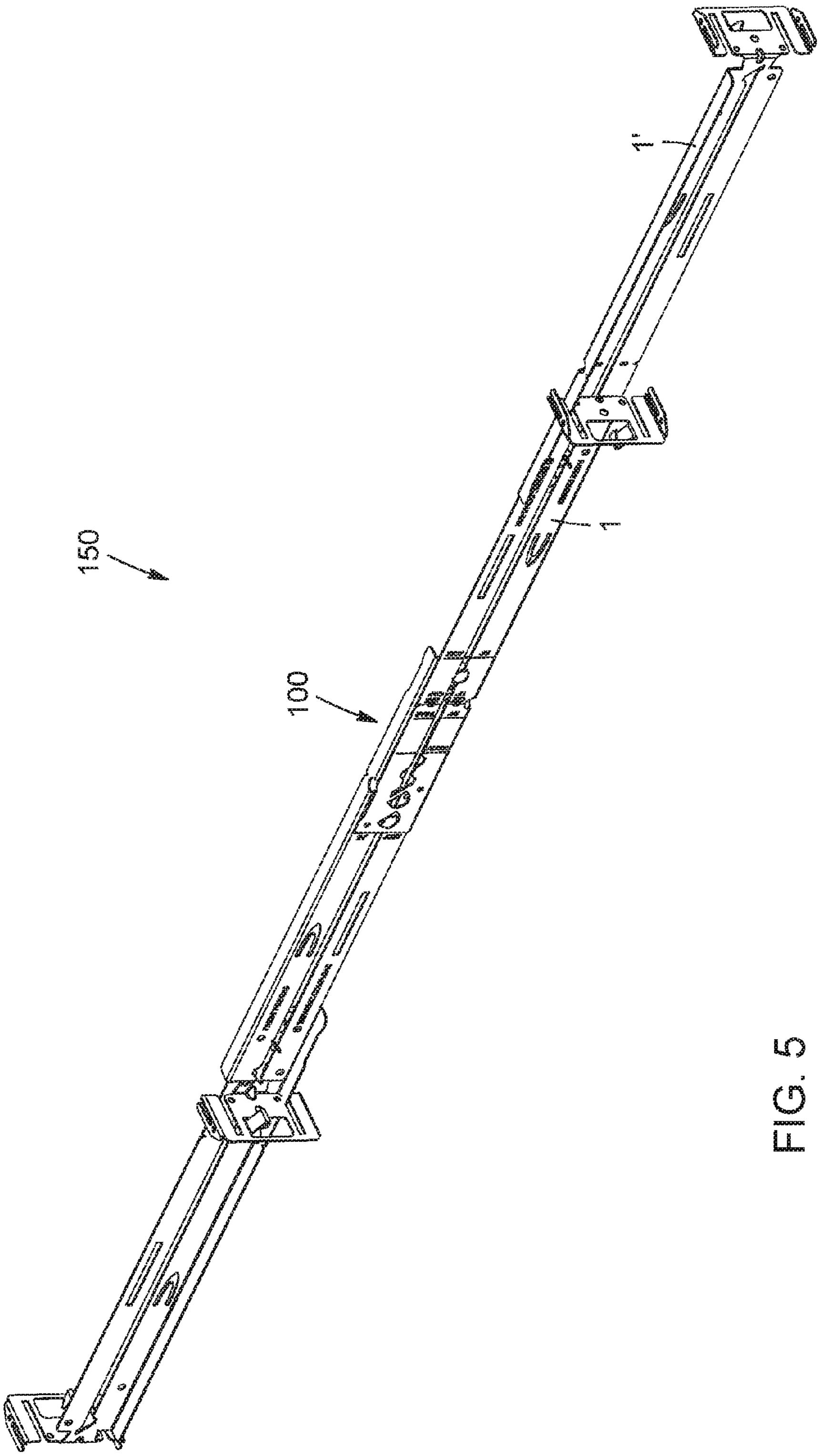
FIG. 5 is a perspective view showing the bar hanger of FIG. 3 extended using further bar hanger members.

In the present embodiment, the bar hanger 100 can be extended to span distances greater than 24". As illustrated in FIG. 5, an end of the bar hanger 100 can be connected to an identical bar hanger member 1' in an inverted configuration in order to form an extended bar hanger 150. The identical bar hanger member 1' is said to be in an inverted configuration in that it has been rotated 180° about the lengthwise axis 6. In this configuration, the rear face 13 of member 1 can be superposed on the rear face 13' of member 1'. Preferably, the member 1' is sized and configured to extend the bar hanger 100 by approximately 12", for example to form an extended bar hanger 150 capable of spanning distances such as 36" or 48", although other dimensions are also possible. Moreover, several members 1' can be chained together in order to effectively span any distance in 12" increments.

In order to extend the bar hanger 100, a second engagement mechanism is provided for securing two members 1, 1' in an end-to-end configuration. With reference to FIGS. 1, 1B and 1D, a third channel slot 23*c* is positioned proximate the second end 9 of the elongated section 15. The third slot 23*c* is oriented at an angle θ', mirroring the angle θ of the first and second slots 23*a*, 23*b*. In this configuration, the second end 9 of member 1 can engaged with the first end 7' of an identical member 1'. The second end 9 further comprises apertures 65*b* which align with apertures 65*a*' in the first end 7' of the identical member 1', for securing the ends 7', 9 together via fasteners.

Figures 6, 6A:
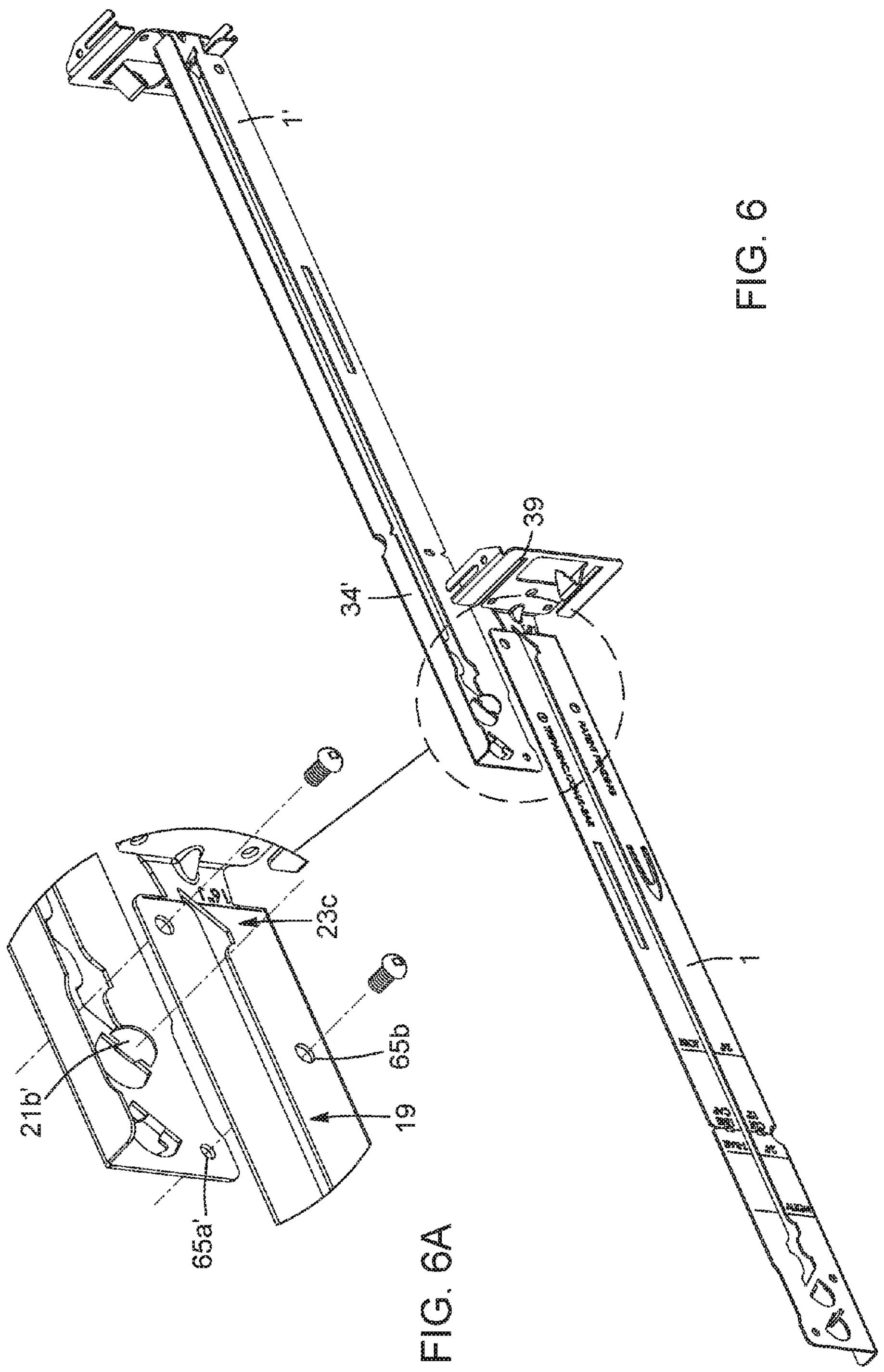
FIGS. 6 and 6A are detail views showing the assembly of two identical bar hanger members of FIG. 1 in the extended configuration of FIG. 5.

As best illustrated in FIGS. 6 and 6A, the bar hanger members 1, 1' can be assembled by inverting member 1', and positioning members 1, 1' in an end-to-end configuration with the second protrusion 21*b*' of member 1' aligned with the third slot 23*c* of member 1. Once aligned, the members 1, 1' can be brought together such that the protrusion 21*b*' is received in slot 23*c*. Member 1' can subsequently slide along channel 19 of member 1, and the horizontal section 34' engages into the deflecting slot 39 to extend its length by a desired amount. The extension can be locked by twisting protrusion 21*b*', and/or by securing fasteners through apertures 65*a*, 65*b*.

In the present embodiment, the bar hanger 100 is further configured to span distances smaller than 16". More specifically, with reference to FIG. 1, the bar hanger member 1 comprises a cut area 27 for cutting away a portion of the first end 7 and reducing the overall length 5 of the member 1. In the present embodiment, the cut area 27 comprises notches and apertures, allowing the body 3 of the member 1 to be easily separated. The cut area 27 further comprises a marker to visually indicate where the body 3 can be cut. It is appreciated that other structural weaknesses can be provided to facilitate the cutting of body 3, such as pierce lines and scores.

As can be appreciated, when member 1 is cut, it can be assembled with another identical cut member 1' in order to form a bar hanger 100 which spans a reduced distance. In the present embodiment, cutting along the cut area 27 removes the apertures 21. Therefore, a third engagement mechanism is provided to secure bar hanger members 1 of reduced length. More particularly, as shown in FIG. 1D, a bendable member 29 and a corresponding locking slot 31 are provided in the elongated section 15 on opposite sides of channel 19. The bendable member 29 and slot 31 are aligned with one another, and are spaced apart from the second end 9 and from the cut area 27.

In the present embodiment, the bendable member 29 is a partial cut-out in the body 3 which can be manually bent in the direction of the front face 11 or in the direction of the rear face 13. Preferably, the bendable member 29 is narrow, elongated and tapered, and thus resembles an arrowhead. The slot 31 is preferably uniform in size, and configured to receive a portion of the bendable member 29 therein in a locking configuration. It is appreciated, however, that other configurations are also possible.

Figures 8, 8A:
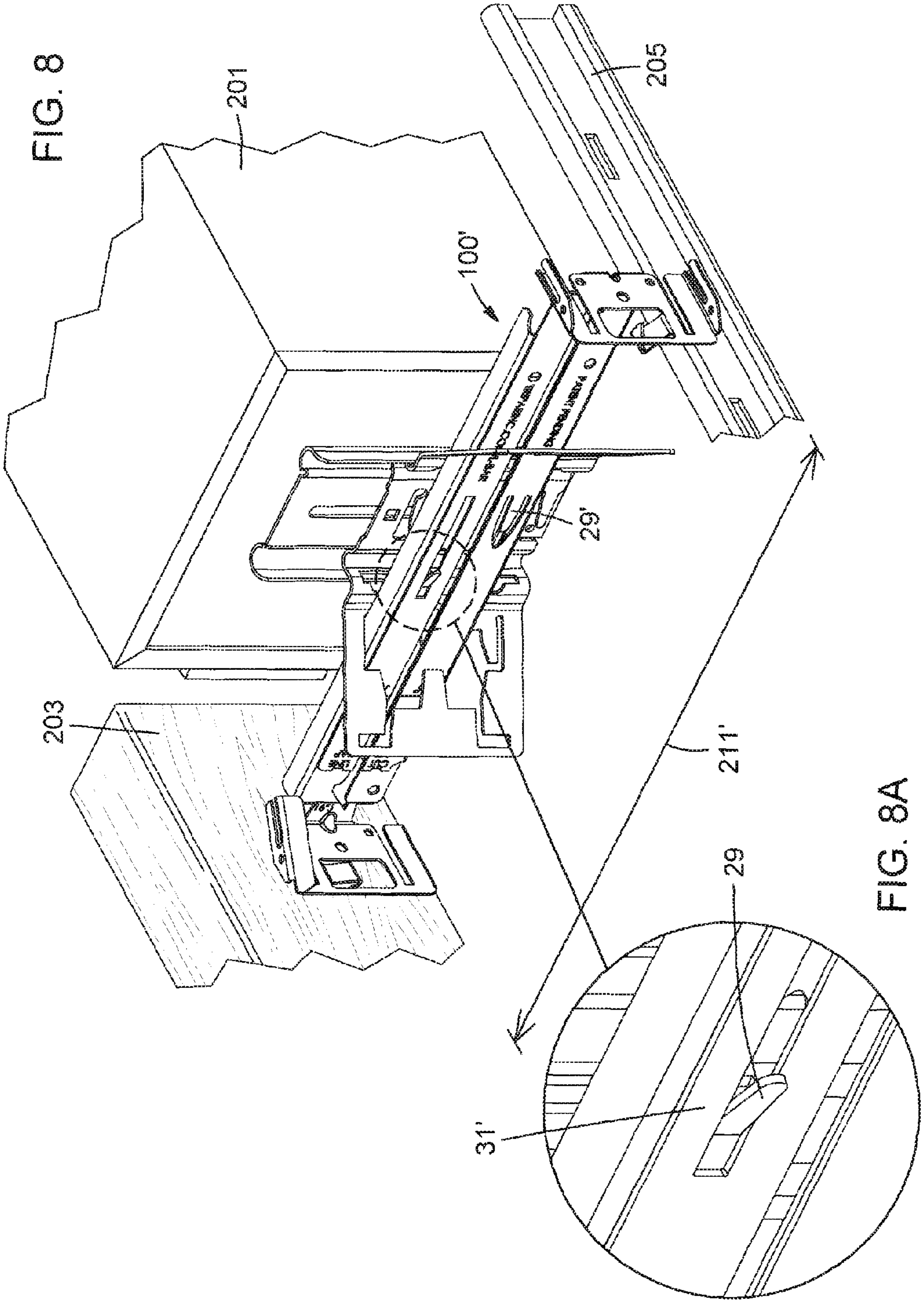
FIG. 8 is a perspective view showing a reduced-length bar hanger in an installed configuration, the reduced-length bar hanger formed by assembling two bar hanger members cut to length.
FIG. 8A is a detail view showing interlocking of the bar hanger members using a bendable member and a slot.

As best illustrated in FIGS. 8 and 8A, a reduced length bar hanger 100' can be assembled by inverting bar hanger member 1', and superposing members 1, 1' to form a bar hanger 100' with a C-shaped cross-section 132' as described above. Preferably, the bendable member 29 of bar hanger member 1 is aligned with corresponding slot 31' of identical member 1'. Similarly, bendable member 29' of identical member 1' is preferably aligned with slot 31 of member 1. In this configuration, bendable member 29 can be pulled out through slot 31' and/or bendable member 29' can be pushed through slot 31, for example using pliers. The bendable members 29, 29' are preferably sized such that forcing them through corresponding slots 31, 31' can lock them in place. As can be appreciated, the bendable members 29, 29' are accessible on a front and rear side of the bar hanger 100', making this engagement mechanism accessible and operable from all sides of the bar hanger 100'. As can be further appreciated, the members 1, 1' can be secured without external fasteners. The engagement mechanism can this also be referred to as a fastenerless locking mechanism.

Figure 7:
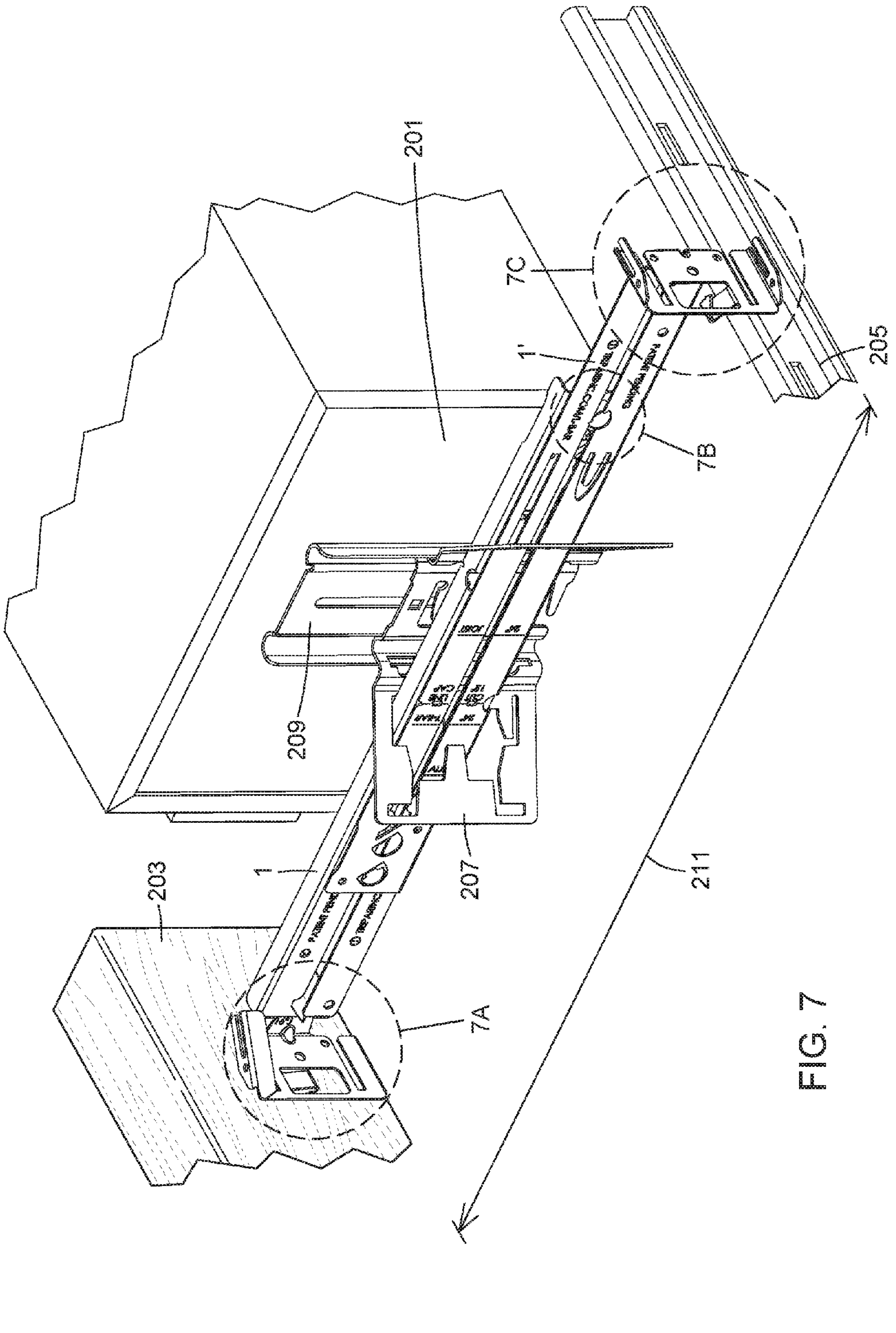
FIG. 7 is a perspective view showing the bar hanger of FIG. 3 in an installed configuration, supporting a ceiling box between a joist and a T-bar.
Figure 7C:
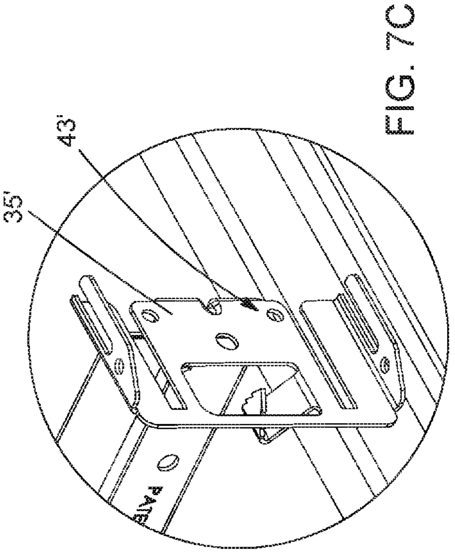
FIG. 7C is a detail view showing the head of one bar hanger member engaged with the T-bar.
Figure 7D:
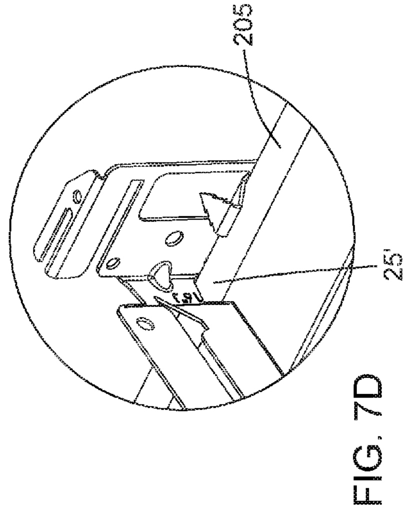
FIG. 7D is an inverted view of FIG. 7C.
Figure 7A:
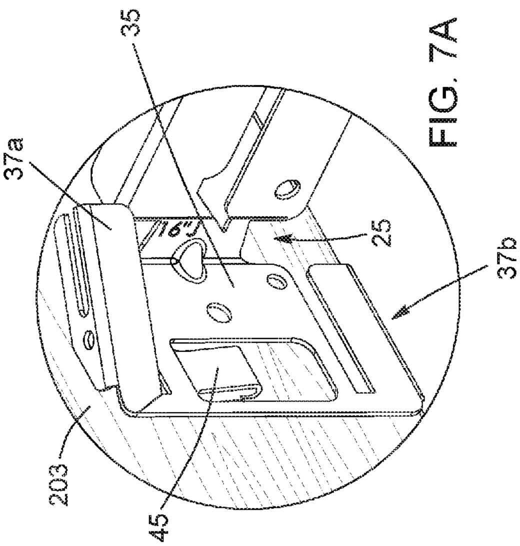
FIG. 7A is a detail view showing the head of one bar hanger member engaged with the joist.
Figure 7B:
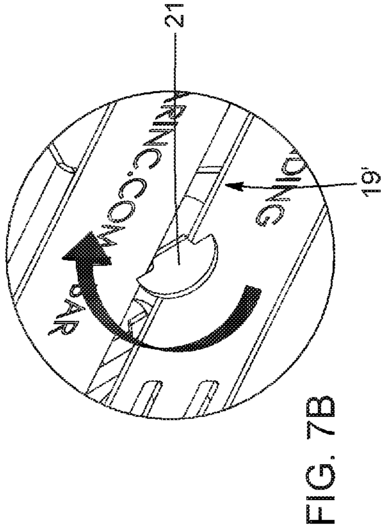
FIG. 7B is a detail view of the protrusion of one bar hanger member engaged in the channel of the other bar hanger member.

With reference now to FIG. 7, an assembled bar hanger 100 is shown in an installed configuration, supporting a ceiling box 201 between a ceiling joist 203 and a T-bar 205. The bar hanger 100 is configured to span a distance 211 of approximately 24", and support the ceiling box 201 via a butterfly bracket 207 and a sliding bracket 209. As shown in FIG. 7A the lower positioning tab **37*b* abuts against the joist 203, ensuring proper alignment of the bar hanger 100 therewith. The upper tab 37*a* is not used in this configuration, and is deflected away so that it does not interfere with installation. Integral nail 45 is hammered into the joist 203 to secure the bar hanger 100 thereto. As shown in FIG. 7B, the protrusion 21 is twisted, for example using pliers, to lock members 1 and 1' together at the set distance. As shown in FIGS. 7C and 7D, the T-bar 205 supports bar hanger 100 by resting in the tapered slot 25. The member 1' can further be secured to T-bar by inserting a self-tapping screw through hole 43' on mounting plate 35'. Since the slot 25 is tapered, the bar hanger 100 is urged toward the top of the T-Bar 205 as the locking screw is driven, ensuring intimate contact between bar hanger 100 and T-Bar 205**.

A shortened bar hanger 100' is shown in the installed configuration in FIG. 8. The shortened bar 100' supports a ceiling box 201 between a ceiling joist 203 and a T-bar 205, across a distance 211' of approximately 12". As shown in FIG. 8A, the arrowhead 29 is pried outward through slot 31', thus locking the members 1 and 1' together.

As can be appreciated, the above-described embodiments have a number of advantages. For example, a bar hanger can be assembled using identical members, making it easier to assemble, and less costly to manufacture. A bar hanger can further be assembled without requiring external fasteners, and using simple tools, such as standard pliers. Moreover, the engagement mechanisms are configured such that components are drawn together when engaged, reducing unwanted play and improving rigidity. Finally, several features have been provided which generally facilitate the installation of the bar hanger compared to existing systems. The bar hanger members can be provided individually and/or as part of a kit which may include several bar hanger members, and/or butterfly brackets and/or sliding brackets for installation. The kit can further include instructions for assembling the bar hanger members.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A bar hanger member for assembling with another substantially identical bar hanger member to form a bar hanger for supporting recessed luminaires, the bar hanger member having a unitary body comprising:

an elongated section extending along a lengthwise axis between first and second ends, the elongated section having an L-shaped profile and having a front face and a rear face;

an aperture opening on the front and rear faces of the elongated section, the aperture comprising a channel extending through the elongated section along the lengthwise axis, and first and second slots proximate to the first end for receiving correspondingly shaped protrusions therethrough; and first and second protrusions extending from the elongated section proximate to the first end and aligned with the channel along the lengthwise axis, the first and second protrusions being shaped to fit through the first and second slots and slide along the channel, the first protrusion extending from the front face of the elongated section, and the second protrusion extending from the rear face of the elongated section;

the bar hanger member being assembled with the substantially identical bar hanger member to form the bar hanger having a C-shaped profile by superposing the elongated section of the bar hanger member on the corresponding elongated section of the substantially identical bar hanger member in an inverted configuration, with the second protrusion of the bar hanger engaging in the channel of the substantially identical member through the first slot of the identical member, and the first protrusion of the substantially identical member engaging in the channel of the bar hanger member through the second slot of the bar hanger member.

2. The bar hanger member according to claim 1, wherein the channel has a uniform width, and wherein the first and second protrusions each comprise a substantially planar stem having a width greater than the width of the channel, the stem being angled relative to the channel for sliding along the channel of the substantially identical member when engaged therewith, each protrusion being twistable about the stem to lock the protrusion of the bar hanger member in a fixed position along the channel of the substantially identical member.

3. The bar hanger member according to claim 2, wherein the width of the stem is tapered, thereby drawing the bar hanger member and the like-member closer together when the first or second protrusion is twisted.

4. The bar hanger member according to claim 1, wherein the first and second protrusions each comprise a stem extending from the elongated section of the bar hanger member, and a head extending from the stem, the stem being sized to fit in the channel and the head being oversized relative to the channel, the head thereby preventing a pull-out of the protrusions when engaged in the channel.

5. The bar hanger member according to claim 4, wherein the first and second slots are sized larger than the head to allow the protrusions to be inserted through the slots when the elongated sections of the bar hanger member and the substantially identical member are superposed.

6. The bar hanger member according to claim 1, further comprising an attachment mechanism at the second end of the elongated section, for securing the second end of the elongated section with the first end of the substantially identical member, thereby forming an elongated bar hanger member.

7. The bar hanger member according to claim 6, wherein the attachment mechanism at the second end of the body comprises a third slot formed in the channel for receiving one of the first and second protrusions therethrough.

8. The bar hanger member according to claim 6, wherein the attachment mechanism at the second end of the body comprises apertures for aligning with corresponding apertures in the first end of the identical member, the apertures being configured for receiving fasteners therethrough.

9. The bar hanger member according to claim 1, wherein the protrusions and the slots are angled at approximately 45° relative to the elongated axis.

10. The bar hanger member according to claim 1, further comprising markings provided in the elongated section for aligning the bar hanger member and the substantially identical bar hanger member in predefined configurations to from the hanger bar with a predefined length.

11. The bar hanger member according to claim 1, further comprising a cuttable section comprising perforations in the elongate section of the bar hanger member for reducing a length of the bar hanger member by cutting off a portion of the second end thereof.

12. The bar hanger member according to claim 1, further comprising an interlocking mechanism for interlocking the bar hanger member with the substantially identical member when configured in a reduced length, the interlocking mechanism comprising a bendable element and a corresponding locking slot in the elongated section between the first and second ends, the bendable element and locking slot being positioned on opposite sides of the channel.

13. The bar hanger member according to claim 1, further comprising an attachment bracket extending from the second end of the elongated section for securing the bar hanger member to the ceiling support structure, the attachment bracket comprising a mounting plate for securing the bar hanger member to a ceiling support structure, and two positioning tabs extending on opposite sides of the mounting plate.

14. The bar hanger member according to claim 13, further comprising deflecting slots extending between the mounting plate and each positioning tab, the deflecting slots allowing the positioning tabs to be deflected relative to the mounting plate.

15. The bar hanger member according to claim 13 wherein the positioning tabs each comprise a fastener slot for receiving a fastener and sliding there along, the slot having an open end allowing the positioning tabs to be slid off the fastener.

16. The bar hanger member according to claim 13, wherein the attachment bracket is integrally formed as part of the body.

17. The bar hanger member according to claim 13, wherein the attachment bracket is substantially symmetric about the lengthwise axis.

18. The bar hanger member according to claim 1, further comprising a mounting plate extending from the second end of the elongated section for securing the bar hanger member to a ceiling support structure, and an angled notch at the end of the elongated section adjacent the mounting plate for resting on a T-bar, the angled notch urging the bar hanger towards a top of the T-bar when the bar hanger is secured thereto.

19. The bar hanger member according to claim 1, wherein the unitary body is made of stamped metal.

20. A kit for forming a bar hanger assembly, the kit comprising at least two bar hanger members each bar hanger having an elongated section extending along a lengthwise axis between first and second ends, the elongated section having an L-shaped profile and having a front face and a rear face;

an aperture opening on the front and rear faces of the elongated section, the aperture comprising a channel extending through the elongated section along the lengthwise axis, and first and second slots proximate to the first end for receiving correspondingly shaped protrusions therethrough; and first and second protrusions extending from the elongated section proximate to the first end and aligned with the channel along the lengthwise axis, the first and second protrusions being shaped to fit through the first and second slots and slide along the channel, the first protrusion extending from the front face of the elongated section, and the second protrusion extending from the rear face of the elongated section; the bar hanger member being assembled with the substantially identical bar hanger member to form the bar hanger having a C-shaped profile by superposing the elongated section of the bar hanger member on the corresponding elongated section of the substantially identical bar hanger member in an inverted configuration, with the second protrusion of the bar hanger engaging in the channel of the substantially identical member through the first slot of the identical member, and the first protrusion of the substantially identical member engaging in the channel of the bar hanger member through the second slot of the bar hanger member.

* * * * *